(12) United States Patent
Wiesbauer et al.

(10) Patent No.: US 10,691,188 B2
(45) Date of Patent: Jun. 23, 2020

(54) ELECTRONIC DEVICE COMPRISING A FIRST CIRCUIT AND A SWITCHABLE SECOND CIRCUIT

(71) Applicant: Infineon Technologies AG, Neubiberg (DE)

(72) Inventors: Andreas Wiesbauer, Poertschach (AT); Daniel Neumaier, Feldkirchen (AT); Christian Jenkner, Klagenfurt (AT)

(73) Assignee: INFINEON TECHNOLOGIES AG, Neubiberg (DE)

(*) Notice: Subject to any disclaimer, the term of this patent is extended or adjusted under 35 U.S.C. 154(b) by 182 days.

(21) Appl. No.: 15/892,164

(22) Filed: Feb. 8, 2018

(65) Prior Publication Data

US 2018/0246551 A1    Aug. 30, 2018

(30) Foreign Application Priority Data

Feb. 27, 2017    (DE) .................. 10 2017 203 123

(51) Int. Cl.
*G06F 1/26* (2006.01)
*G06F 1/3203* (2019.01)
*H04R 19/00* (2006.01)

(52) U.S. Cl.
CPC .............. *G06F 1/26* (2013.01); *G06F 1/3203* (2013.01); *H04R 19/005* (2013.01); *H04R 2201/003* (2013.01)

(58) Field of Classification Search
CPC ........................................................ G06F 1/26
See application file for complete search history.

(56) References Cited

U.S. PATENT DOCUMENTS

| | | | |
|---|---|---|---|
| 2012/0096288 A1* | 4/2012 | Bates | G06F 1/206 713/320 |
| 2016/0007101 A1 | 1/2016 | Straeussnigg et al. | |
| 2016/0277844 A1 | 9/2016 | Kopetz et al. | |
| 2016/0380637 A1* | 12/2016 | Loiseau | H01L 31/024 327/513 |
| 2017/0262030 A1* | 9/2017 | Lee | G06F 1/26 |

FOREIGN PATENT DOCUMENTS

| | | |
|---|---|---|
| DE | 102015110094 A1 | 1/2016 |
| DE | 102016203228 A1 | 9/2016 |

* cited by examiner

*Primary Examiner* — Kim Huynh
*Assistant Examiner* — Joshua Neveln
(74) *Attorney, Agent, or Firm* — Slater Matsil, LLP

(57) ABSTRACT

Examples of the present disclosure provide an electronic device in a package, the electronic device comprising a first circuit having a temperature sensitive behavior and a second circuit being switchable between a first operating mode and at least one second operating mode. A power consumption of the second circuit in the first operating mode is higher than a power consumption of the second circuit in the second operating mode. The electronic device comprises a controller configured to switch the second circuit into the first operating mode during a first time interval and into the second operating mode during a second time interval. The controller is further configured to cause an additional power consumption in the electronic device during the second time interval to reduce or compensate a difference between an overall power consumption of the electronic device during the first time interval and the second time interval.

20 Claims, 6 Drawing Sheets

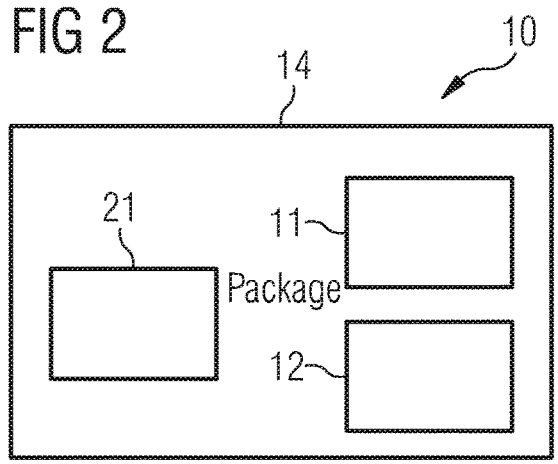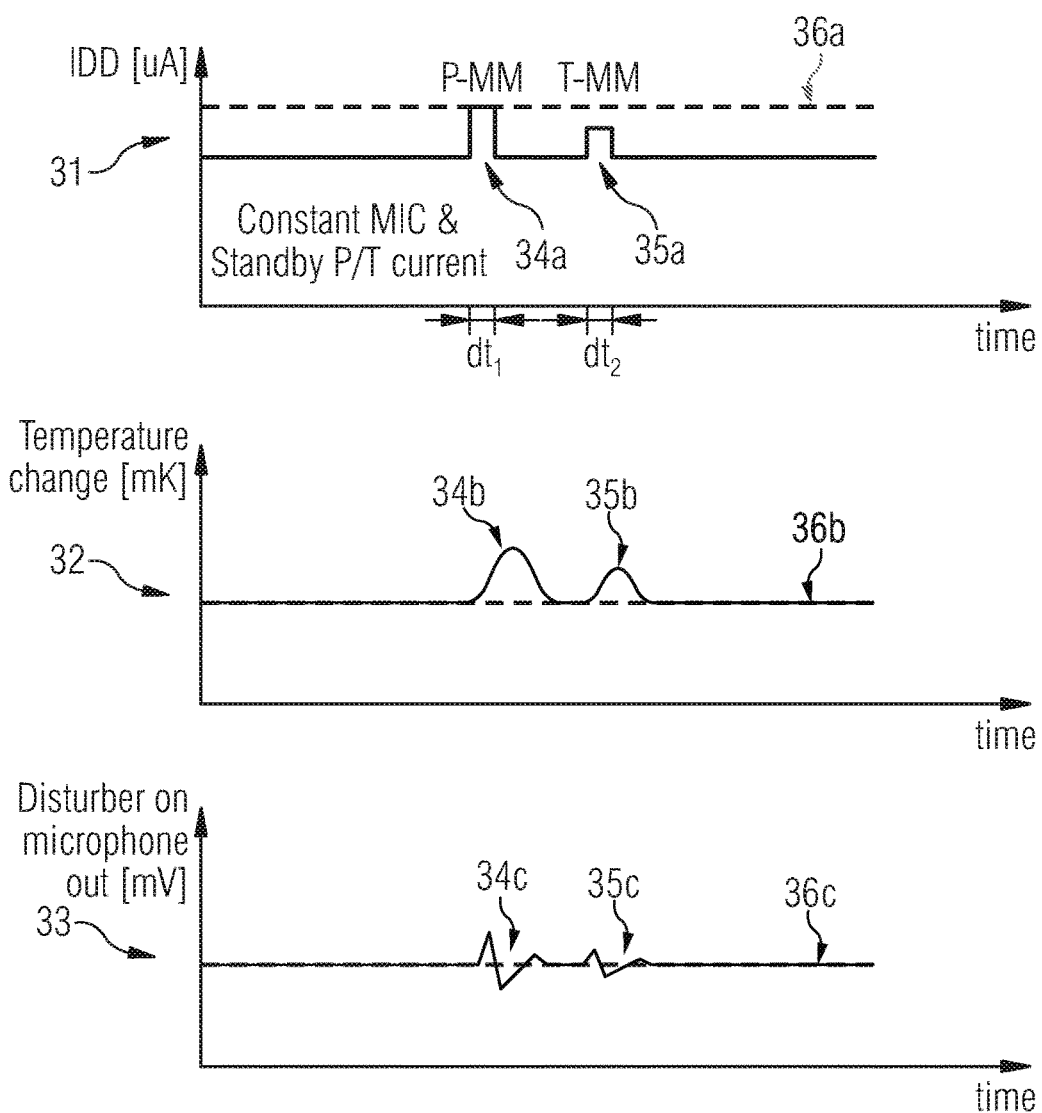

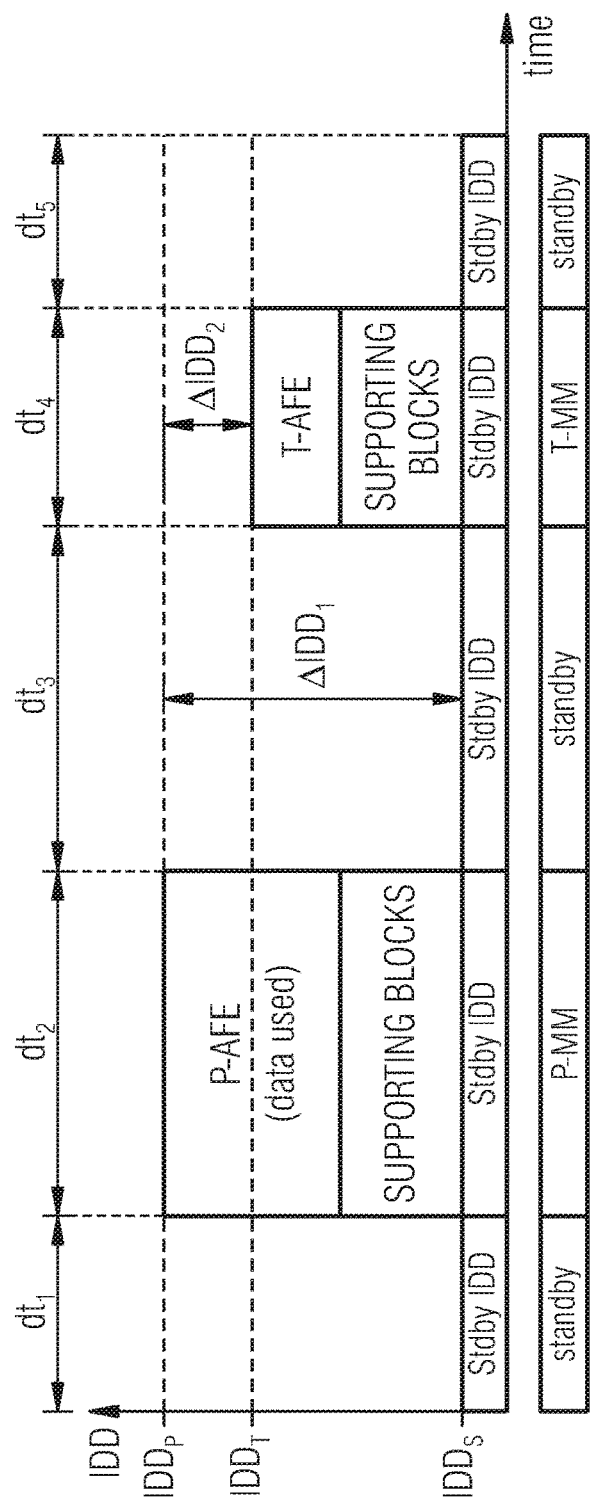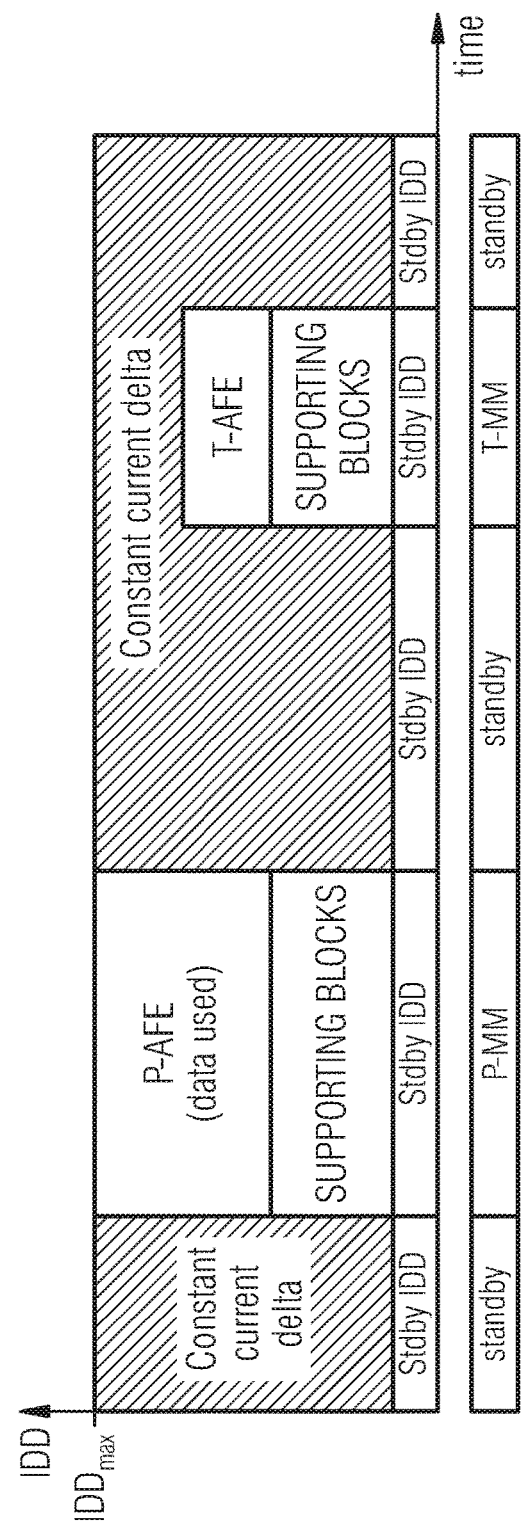

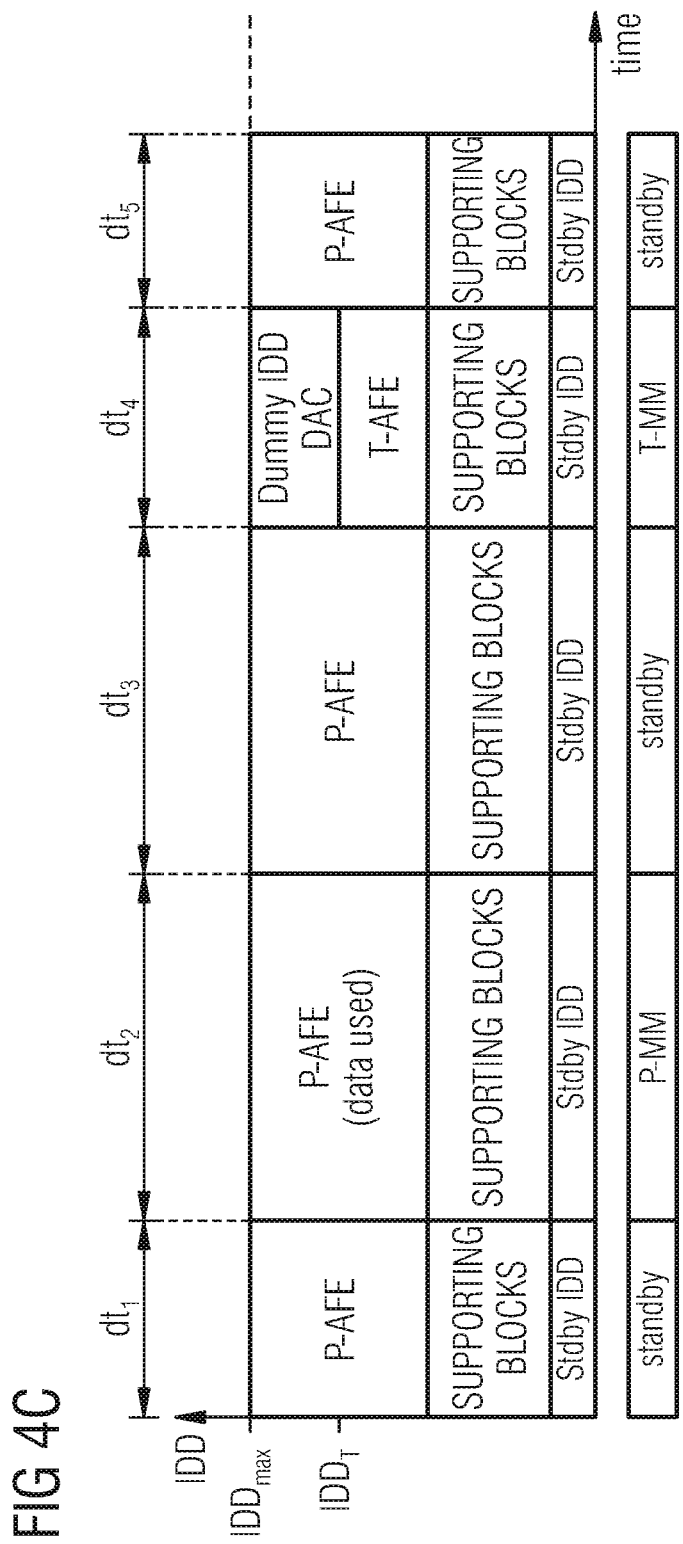

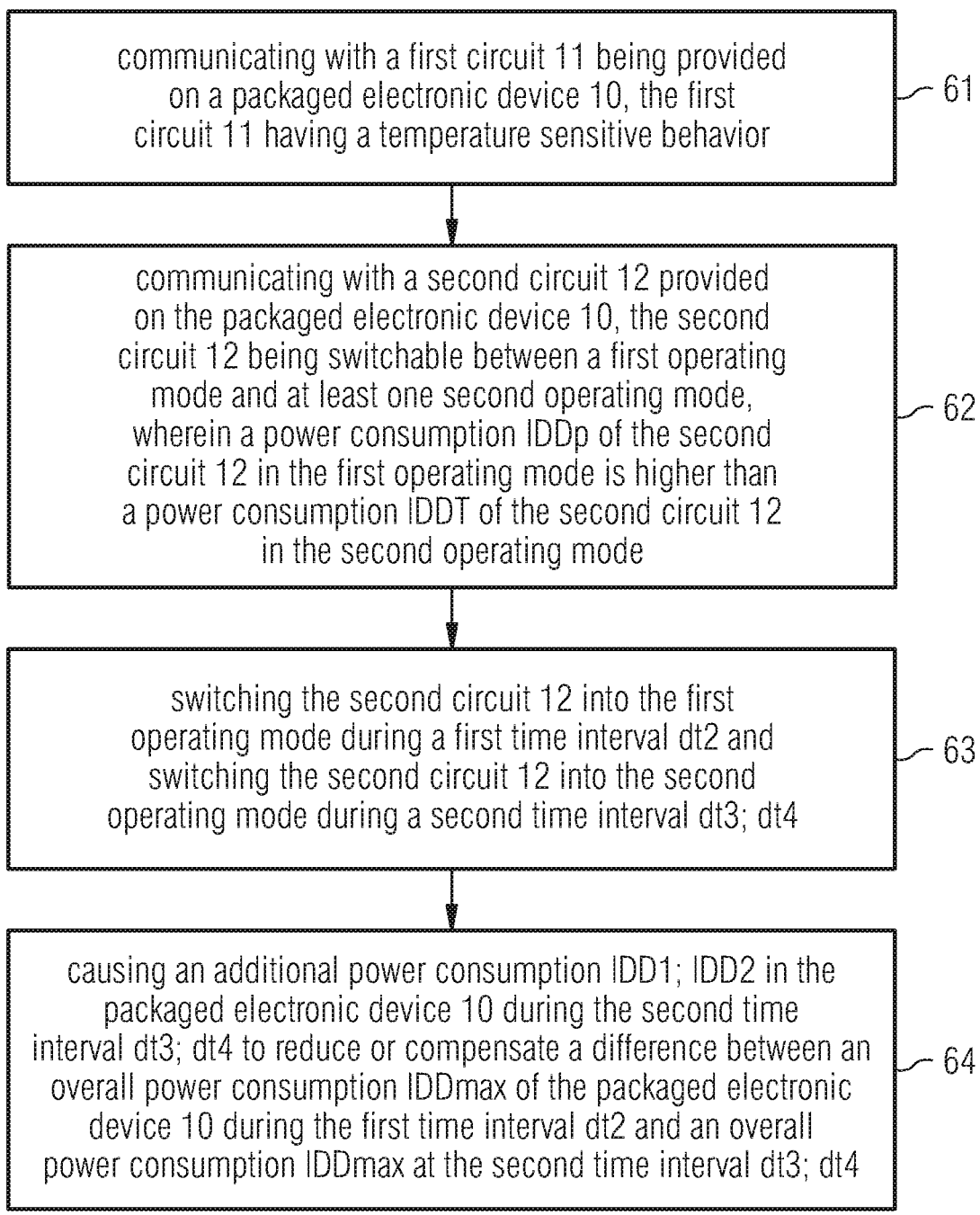

ELECTRONIC DEVICE COMPRISING A FIRST CIRCUIT AND A SWITCHABLE SECOND CIRCUIT

This application claims the benefit of German Application No. 10 2017 203 123.9, filed on Feb. 27, 2017, which application is hereby incorporated herein by reference in its entirety.

TECHNICAL FIELD

This disclosure relates in general to a packaged electronic device.

BACKGROUND

A packaged electronic device consumes a certain amount of power and produces a respective amount of heat, which may also be referred to as self-heating. The temperature dependency of the first circuit (including self-heating) may conventionally be calibrated away. This calibration relies on measurement of the temperature. Since common temperature measurements may have a good ability to track slow changes, this approach works well for slow changes of the temperature. However, fast tracking of changes in temperature may be difficult.

SUMMARY

Examples of this disclosure provide an electronic device in a package, the electronic device comprising a first circuit having a temperature sensitive behavior and a second circuit being switchable between a first operating mode and at least one second operating mode. A power consumption of the second circuit in the first operating mode is higher than a power consumption of the second circuit in the second operating mode. The electronic device comprises a controller configured to switch the second circuit into the first operating mode during a first time interval and into the second operating mode during a second time interval. The controller is further configured to cause an additional power consumption in the electronic device during the second time interval to reduce or compensate a difference between an overall power consumption of the electronic device during the first time interval and the second time interval.

Further examples provide a method comprising a step of communicating with a first circuit being provided on a packaged electronic device, the first circuit having a temperature sensitive behavior, and a step of communicating with a second circuit provided on the packaged electronic device, the second circuit being switchable between a first operating mode and at least one second operating mode, wherein a power consumption of the second circuit in the first operating mode is higher than a power consumption of the second circuit in the second operating mode. The method according to this example further comprises a step of switching the second circuit into the first operating mode during a first time interval and switching the second circuit into the second operating mode during a second time interval, and causing an additional power consumption in the packaged electronic device during the second time interval to reduce or compensate a difference between an overall power consumption of the packaged electronic device during the first time interval and the second time interval.

Further examples provide a computer readable digital storage medium having stored thereon a computer program having a program code for performing, when running on a computer, a method for communicating with a first circuit being provided on a packaged electronic device, the first circuit having a temperature sensitive behavior, and communicating with a second circuit provided on the packaged electronic device, the second circuit being switchable between a first operating mode and at least one second operating mode, wherein a power consumption of the second circuit in the first operating mode is higher than a power consumption of the second circuit in the second operating mode, and switching the second circuit into the first operating mode during a first time interval and switching the second circuit into the second operating mode during a second time interval, and causing an additional power consumption in the packaged electronic device during the second time interval to reduce or compensate a difference between an overall power consumption of the packaged electronic device during the first time interval and the second time interval.

BRIEF DESCRIPTION OF THE DRAWINGS

Examples of the present disclosure are described herein making reference to the appended drawings.

FIG. 2 shows a top view of an electronic device according to another example;

FIG. 3 shows three diagrams according to an example;

FIG. 4A shows a timing diagram according to an example;

FIG. 4B shows a further timing diagram according to an example;

FIG. 4C shows a further timing diagram according to an example;

FIG. 6 shows a flowchart of a method according to an example.

DETAILED DESCRIPTION OF ILLUSTRATIVE EMBODIMENTS

Figure 1A:
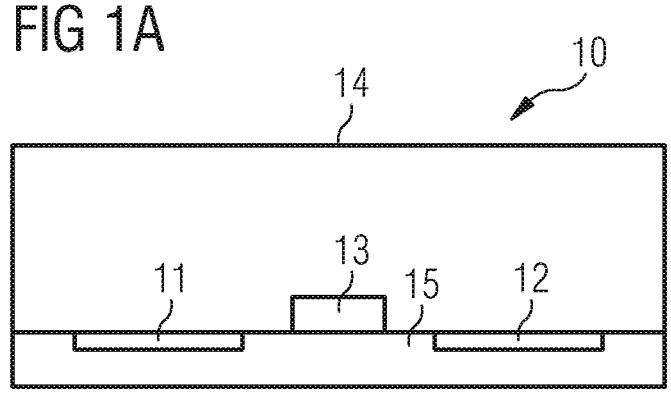
FIG. 1A shows a side view of an electronic device according to an example.

Equal or equivalent elements or elements with equal or equivalent functionality are denoted in the following description by equal or equivalent reference numerals.

In the following description, a plurality of details is set forth to provide a more thorough explanation of examples of the present disclosure. However, it will be apparent to those skilled in the art that examples of the present disclosure may be practiced without these specific details. In other instances, well known structures and devices are shown in block diagram form rather than in detail in order to avoid obscuring examples of the present disclosure. In addition, features of the different examples described hereinafter may be combined with each other, unless specifically noted otherwise.

Figure 1B:
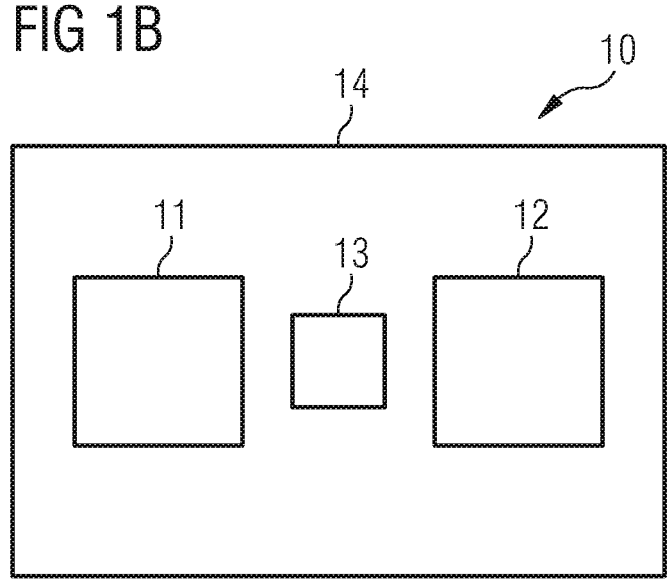
FIG. 1B shows a top view of the electronic device of FIG. 1A.

FIG. 1 shows an electronic device 10 according to an example. The electronic device 10 may be arranged within a package 14, for example within a housing 14. Other examples may provide a casting compound, for instance, which is casted over the electronic device 10 to provide a packaged electronic device 10.

The electronic device 10 may comprise a first circuit 11, which is also referred to as an electronic circuit or integrated circuit (IC). The first circuit 11 has a temperature sensitive behavior. For example, the behavior or performance of the first circuit 11 is dependent on the temperature within the package 14.

The electronic device 10 may further comprise a second circuit 12. The second circuit 12 may be switchable between a first operating mode and at least one second operating mode. According to this example, a power consumption of the second circuit 12 in the first operating mode is higher than a power consumption of the second circuit 12 in the second operating mode.

The electronic device 10 may comprise a semiconductor material 15, such as silicon, for example. The first and second circuits 11, 12 may be integrated circuits which are provided within the semiconductor material 15 by means of etching processes, for example.

By way of a non-limiting example, the first operating mode of the second circuit 12 may be an On-mode and the second operating mode of the second circuit 12 may be an Off-mode. It may also be possible that the second operating mode of the second circuit 12 may be an idle-mode, a standby-mode, or a different On-mode having a lower power draw than the first operating mode.

The electronic device 10 may further comprise a controller 13. The controller 13 may be located inside the package 14, as exemplarily shown in FIGS. 1A and 1B, or the controller 13 may be located outside the package 14. In either case, the controller 13 may be coupled with the electronic device 10, in particular electrically coupled with the first circuit 11 and the second circuit 12.

The controller 13 may be configured to switch the second circuit 12 into the first operating mode during a first time interval. The controller 13 may further be configured to switch the second circuit 12 into the second operating mode during a second time interval.

The electronic device 10 may have an overall power consumption which may, for instance, be dependent on the chosen operating mode of the respective circuit 11, 12. Based thereon, the overall power consumption of the electronic device 10 may vary over time.

Thus, the controller 13 may be configured to cause an additional power consumption in the electronic device 10 during the second time interval in order to reduce or compensate a difference between an overall power consumption of the electronic device 10 during the first time interval and an overall power consumption of the electronic device 10 during the second time interval.

FIG. 2 shows a further example of an electronic device 10. The electronic device 10 is packaged by means of a housing 14. The electronic device 10 comprises a first circuit 11 and a second circuit 12.

According to the example of FIG. 2, the electronic device 10 may further comprise an electrical component 21. The electrical component 21 may be a Micro-Electro-Mechanical-System (MEMS). The electrical component 21 may be a microphone, for example. The first circuit 11 may be coupled with the electrical component 21. For example, the first circuit 11 may provide the circuitry for the electrical component 21.

The first circuit 11 may be an Application Specific Integrated Circuit (ASIC) that is coupled with the electrical component 21. In the example of FIG. 2, the first circuit 11 may be an ASIC for controlling a MEMS-microphone 21.

At least one of the electrical component 21 and the first circuit 11 may comprise a temperature sensitive behavior. For example, if the temperature within the package 14 rises, the pressure inside the package 14 increases. In this example, the increased pressure causes the membrane of the microphone 21 to be deflected. This may cause disturbances at certain frequencies at the microphone output signal and therefore audible noise. It has been found that MEMS-microphones, for instance, already react to variances in temperature within a range of several µK (micro Kelvin).

The variation of the temperature inside the package 14 may be caused by the power consumed by the electronic device 10, and in particular by the power consumed by the circuits 11, 12 (or by electrical power-drawing components in general) which are contained inside the package 14.

In the example of FIG. 2, the electronic device 10 may comprise a switchable second circuit 12. The second circuit 12 may be at least one of a pressure sensing circuit, a temperature sensing circuit, a moisture sensing circuit, and a gas sensing circuit. In this example, the second circuit 12 may be a combined temperature/pressure sensing circuit 12. The second circuit 12 may be switchable between a first operating mode and a second operating mode.

FIG. 3 shows three diagrams: the top diagram 31 shows a timing diagram of cyclic mode-switching of the second circuit 12, the middle diagram 32 shows the resulting temperature variances inside the package 14, and the bottom diagram 33 shows the disturbances that can be measured at the microphone output signal, for example by means of the first circuit 11 which may be a microphone-ASIC as described above.

Reference is made to the first diagram 31 which shows the current draw (IDD) of the electronic device 10 over time. As can be seen, during a first time interval dt1 the P/T-sensor 12 is powered in order to conduct a pressure measurement, which is visualized by the first duty cycle signal 34a. During a second time interval dt2 the P/T-sensor 12 is powered in order to conduct a temperature measurement, which is visualized by the second duty cycle signal 35a.

In response to the pressure measurement, but with a short delay, the temperature inside the package 14 rises due to the power draw of the P/T-sensor 12, which is visualized by the signal 34b in the middle diagram 32. In response to the subsequent temperature measurement, but with a short delay, the temperature inside the package 14 rises due to the power draw of the P/T-sensor 12, which is visualized by the signal 35b in the middle diagram 32.

The temperature rise 34b (diagram 32) caused by the pressure measurement 34a (diagram 31), causes a disturbance 34c (diagram 33) at the output signal of the microphone. Furthermore, the temperature rise 35b (diagram 32) caused by the temperature measurement 35a (diagram 31) causes a disturbance 35c (diagram 33) at the output signal of the microphone.

Diagrams 31, 32, 33 further show dashed lines which represent a proposed example of the present disclosure. According to this example, the controller 13 may be configured to maintain a constant amount of the overall power consumption of the electronic device 10 during the first time interval dt1 and the second time interval dt2. Accordingly, it is proposed to maintain the current draw of the electronic device 10 at a constant level, which is represented by the dashed line 36a (diagram 31).

Since the duty cycle signals 34a, 35a stay below this constant level 36a, the temperature inside the package 14 is accordingly kept at a constant level, which is represented by the dashed line 36b (diagram 32).

Since the power draw of the circuits 11, 12 does not cause any significant variances in temperature inside the package 14, no disturbances at the microphone output signal are caused, which is represented by the dashed line 36c (diagram 33).

In the previous and the following examples, it is assumed that the supply voltage Vdd of the electronic device 10 is kept substantially constant. The power draw, and the related heat that is produced by the circuits 11, 12 and/or electronic devices 21 contained within the package 14, is defined based on the known formula P=U*I, where P represents the power, U represents the electric voltage and I represents the electric current. For simplicity of the description of the disclosed examples, only a variation of the electric current IDD may be exemplarily mentioned. However, since the heat generation is based on the consumed power P, also a variation of the voltage Vdd may be possible, or a combination of a variation of the electric current IDD and the electric voltage Vdd may be possible.

As mentioned above, since the supply voltage Vdd is assumed to be constant in the described examples, variations in the electric current IDD may be synonymously used within this disclosure for a variation in the overall power consumption ΔP.

FIG. 4A shows a timing diagram in which different operating modes of the second circuit 12 during different time intervals are depicted. The y-axis represents the overall current draw IDD of the electronic device 10 and the x-axis represents time t.

During a first time interval dt1 the second circuit 12 is in standby mode. Accordingly, only a low standby current is drawn by the second circuit 12.

During a second time interval dt2 the second circuit 12 is powered in order to conduct a pressure measurement. Furthermore, optional supporting blocks, such as ADC, LDO, OSC, Bandgap, Reset, etc., may be powered at the same time. Accordingly, the second circuit 12 may draw a first current and the optional supporting blocks may draw a second current such that the electronic device 10 may have an overall power consumption, e.g., an overall current draw IDDP during the pressure measurement.

During a third time interval dt3 the second circuit 12 is again switched to standby mode. In this case, the standby mode may be regarded as the second operating mode of the second circuit 12. That is, the second circuit 12 is switched from a first operating mode (pressure sensing mode at dt2) to a second operating mode (standby mode at dt3).

Thus, the second circuit 12 may draw a standby current IDDS and thus the overall power consumption of the electronic device 10 may be limited to this low standby current IDDS. The standby current IDDS is lower than the overall current IDDP that is drawn by the electronic device 10 during the pressure measurement in the second time interval dt2. Accordingly, there is a current delta ΔIDD1 of the overall power consumption (e.g., overall current draw) of the electronic device 10 between the first mode (pressure sensing mode) and the second mode (standby mode) of the second circuit 12.

During a fourth time interval dt4, the second circuit 12 is powered in order to conduct a temperature measurement. In this case, the temperature measurement mode may be regarded as the second operating mode of the second circuit 12. That is, the second circuit 12 is switched from a first operating mode (pressure sensing mode at dt2) to a second operating mode (temperature sensing mode at dt4). Furthermore, the temperature sensing mode may directly follow the pressure sensing mode, e.g., without switching into the standby mode as exemplarily shown at dt3.

Furthermore, optional supporting blocks, such as ADC, LDO, OSC, Bandgap, Reset, etc., may be powered during the temperature sensing mode at dt4. Accordingly, the second circuit 12 may draw a first current and the optional supporting blocks may draw a second current such that the electronic device 10 may have an overall power consumption, e.g., an overall current draw IDDT during the temperature measurement interval dt4.

The overall current IDDT of the electronic device 10 during the temperature measurement is lower than the overall current IDDP that is drawn by the electronic device 10 during the pressure measurement in the second time interval dt2. Accordingly, there is a current delta ΔIDD2 of the overall power consumption (e.g., overall current draw) of the electronic device 10 between the first mode (pressure sensing mode) and the second mode (temperature sensing mode) of the second circuit 12.

During a fifth time interval dt5 the second circuit 12 is again switched to standby mode. Thus, the overall power consumption of the electronic device 10 is again limited to the standby current IDDS.

As can be seen in FIG. 4B there is a maximum constant overall power consumption, e.g., a maximum constant overall current draw IDDmax of the electronic device 10. The maximum constant overall power consumption IDDmax may be equal to or higher than a maximum instant power consumption IDDP, such as during the pressure sensing mode.

Furthermore, there are several current deltas, as explained above with reference to the examples ΔIDD1 and ΔIDD2. In FIG. 4B all constant current deltas over time are indicated by crosshatched lines.

FIG. 4C shows an example of the electronic device 10 according to the present disclosure. According to this example, the controller 13 may be configured to cause an additional power consumption in the electronic device 10 during a second time interval to reduce or compensate a difference between an overall power consumption of the electronic device 10 during a first time interval and the second time interval.

According to a first example, it is assumed that the time interval dt2 is a first time interval in which the second circuit 12 is switched into its first operating mode, e.g., into a pressure sensing mode, as explained above. In this case, the overall power consumption of the electronic device 10 is at a maximum power consumption level IDDmax.

Then, the time interval dt3 is a second time interval in which the second circuit 12 is switched into its second operating mode, e.g., into a standby mode, as explained above. In this case, the overall power consumption of the electronic device 10 is limited to the standby current IDDS. As mentioned above, the variations in the overall power consumption level (ΔIDD1=IDDmax−IDDS) of the electronic device 10 may cause variations in temperature inside the package 14 and may thus lead to pressure variations and noise at the microphone output signal.

In order to compensate such thermal variations, the controller 13 may cause additional power consumption during the second time interval dt3. As exemplarily shown in FIG. 4C, the controller 13 may switch the second circuit 12 into the pressure sensing mode during the second time interval dt3. Even though there is no pressure data to be captured during the second time interval dt3, the overall power consumption of the electronic device 10 is kept at a constant level, e.g., at IDDmax.

Accordingly, the controller 13 may cause an additional power consumption during the second time interval dt3 which additional power consumption includes the magnitude of the power consumption delta ΔIDD1 (FIG. 4A).

According to this example, the controller 13 is configured to cause the additional power consumption during the second time interval dt3 by switching the second circuit 12 into the first mode during the second time interval dt3.

The controller 13 may also be configured to cause the additional power consumption during a third time interval dt1 and a fourth time interval dt5 by switching the second circuit 12 into the first mode during the respective time intervals dt1, dt5.

According to a second example, it is now assumed that the time interval dt4 is a second time interval in which the second circuit 12 is switched into its second operating mode, e.g., into a temperature sensing mode, as explained above. In this case, the overall power consumption of the electronic device 10 may include a magnitude of IDDT during the temperature measurement. As mentioned above, the variations in the overall power consumption level ($\Delta$IDD2=IDDmax−IDDT) of the electronic device 10 may cause variations in temperature inside the package 14 and may thus lead to pressure variations and noise at the microphone output signal.

In order to compensate such thermal variations, the controller 13 may cause additional power consumption during the second time interval dt4. As exemplarily shown in FIG. 4C, the controller 13 may be configured to cause the additional power consumption during the second time interval dt4 by powering a third circuit during the second time interval dt4. Accordingly, during the second time interval dt4 the second circuit 12 is switched into its second operating mode (temperature sensing mode) and the third circuit is powered at the same time. Furthermore, optional supporting blocks may be powered.

The third circuit may be a Digital-to-Analog-Converter (DAC) for example. The third circuit may be configured to provide for a dummy current draw, for instance. That is, the third circuit may be construed such that the magnitude of its current draw is as high as to keep the overall power consumption of the electronic device 10 at its constant level IDDmax. In this case, the current that is drawn by the third circuit corresponds to the current delta $\Delta$IDD2 (FIG. 4A).

Accordingly, the controller 13 may be configured to cause the additional power consumption $\Delta$IDD2 in the electronic device 10 during the second time interval dt4 by powering the third circuit during the second time interval dt4 to reduce or compensate the difference $\Delta$IDD2 between an overall power consumption IDDmax of the electronic device 10 during the first time interval dt2 and an overall power consumption IDDT of the electronic device 10 during the second time interval dt4.

According to yet a further example, the controller 13 may be configured to adjust the power consumption of the third circuit (e.g. DAC) such that its power consumption during the second time interval dt4 reduces or compensates the difference $\Delta$IDD2 between the overall power consumption IDDmax of the electronic device 10 during the first time interval dt2 and an overall power consumption IDDT of the electronic device 10 during the second time interval dt4. The controller 13 may be configured to dynamically adjust the power consumption of the third circuit in order to keep the overall power consumption of the electronic device 10 at a constant level IDDmax.

When considering FIGS. 4A, 4B and 4C it can be seen that the controller 13 may be configured to fill gaps in overall power consumption (e.g., the constant current deltas) by switching or powering certain circuits during a respective time interval.

According to yet another example, the electronic device 10 may include a plurality of switchable circuits. Each of the circuits may have a different power consumption which is known to the controller 13. Thus, in order to fill the current delta gaps (FIG. 4B) with the correct power consuming circuit (FIG. 4C), the controller 13 must be aware of the scheduling of any measurements during the time intervals dt1 to dt5.

Thus, to fill the current delta gaps, the controller 13 may be configured to power one or more circuits having a total power consumption that sums up to the amount of the current delta gap, for example $\Delta$IDD1 or $\Delta$IDD2. However, in this case the controller 13 may previously estimate the total power consumption of possible combinations of circuits to be powered. Therefore, the controller 13 knows which circuit may include which amount of power consumption.

Accordingly, the controller 13 may be configured to selectively power only those circuits which cause the desired total overall power consumption IDDmax of the electronic device 10.

Stated in more general terms, the electronic device 10 may include a plurality of switchable circuits and the controller 13 may be configured to estimate, prior to powering one or more of the plurality of circuits during the second time interval dt3; dt4, the resulting overall power consumption IDDmax of the electronic device 10 when these one or more circuits are powered, and wherein the controller 13 is further configured to selectively power those one or more circuits during the second time interval dt3; dt4 which circuits cause the additional power consumption $\Delta$IDD1; $\Delta$IDD2 in the electronic device 10 during the second time interval dt3; dt4.

Figure 5:
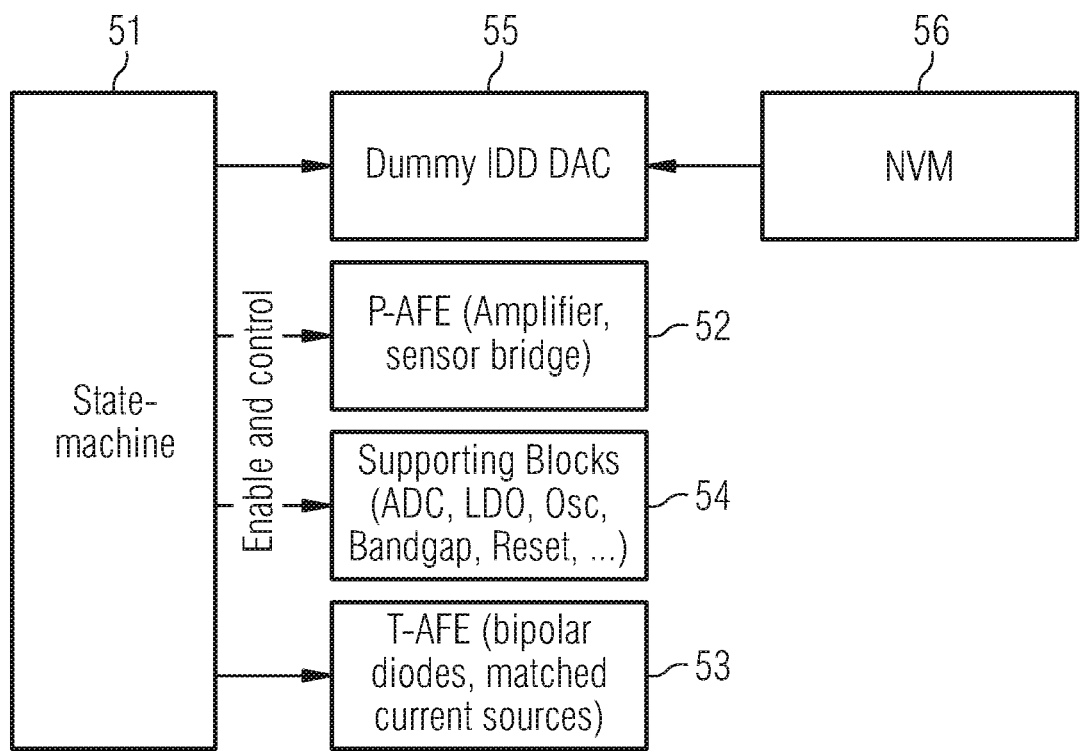
FIG. 5 shows a block diagram of a controller and a state machine according to an example.

FIG. 5 shows a block diagram of a controller 13 having an exemplary state machine 51 for executing the above mentioned tasks. The state machine 51 may be configured to communicate with a Pressure Application Front End (P-AFE) for executing the above described pressure measurements, the P-AFE being symbolized by block 52.

The state machine 51 may further be configured to communicate with a Temperature Application Front End (T-AFE) for executing the above described temperature measurements, the T-AFE being symbolized by block 53.

The state machine 51 may still further be configured to communicate with one or more of the above described supporting blocks which are symbolized by block 54.

Furthermore, the state machine 51 may be configured to communicate with the above described third circuit which may be a dummy-DAC, for instance. This dummy-DAC is symbolized by block 55. Furthermore, block 55 is coupled with a Non-Volatile Memory (NVM) symbolized by block 56.

The state machine 51 may be aware of the scheduled measurements (FIGS. 4A, 4B, 4C) and simply switches in the desired blocks in order to fill the power consumption gaps. The power consumption (e.g. current) difference needed by the dummy-DAC 55 may be trimmed in the frontend test and stored in the NVM 56.

In the description above, the controller 13 was described as being configured to keep the magnitude of the overall power consumption IDDmax of the electronic device 10 at a level, which corresponded to the magnitude of the maximum power consumption IDDP during the pressure sensing mode of the second circuit 12. However, stated in more general terms, the controller 13 may be configured to keep the magnitude of the overall power consumption IDDmax of the electronic device 10 at a level which is at or above the magnitude of the highest instantaneous power consumption IDDP of the electronic device 10 during a certain time interval.

Furthermore, the controller 13 may be configured to cause the additional power consumption such that the magnitude of the overall power consumption IDDmax of the electronic device 10 during the second time interval dt3, dt4 is the same as the magnitude of the overall power consumption of the electronic device 10 during the first time interval dt2. In other words, the controller 13 is configured to keep the overall power consumption IDDmax of the electronic device 10 at a constant level during at least the first time interval dt2 and the second time interval dt3, dt4.

According to yet another example, the controller 13 may be configured to cause the additional power consumption ΔIDD1, ΔIDD2 such that the overall power consumption IDDmax of the electronic device 10 during the second time interval dt3; dt4 differs by less than ±30%, or by less than ±20%, or by less than ±10% from the overall power consumption IDDmax of the electronic device 10 during the first time interval dt2. In other words, the magnitude of the overall power consumption IDDmax of the electronic device 10 during the first time interval dt2 may deviate up to ±30%, or ±20%, or ±10% from the overall power consumption IDDmax of the electronic device 10 during the second time interval dt3, dt4.

FIG. 6 shows a block diagram of a method according to an example.

In block 61 it is communicated with a first circuit 11 being provided on a packaged electronic device 10, the first circuit 11 having a temperature sensitive behavior.

In block 62 it is communicated with a second circuit 12 provided on the packaged electronic device 10, the second circuit 12 being switchable between a first operating mode and at least one second operating mode, wherein a power consumption IDDP of the second circuit 12 in the first operating mode is higher than a power consumption IDDT of the second circuit 12 in the second operating mode.

In block 63 the second circuit 12 is switched into the first operating mode during a first time interval dt2 and the second circuit 12 is switched into the second operating mode during a second time interval dt3; dt4.

In block 64 an additional power consumption is caused in the packaged electronic device 10 during the second time interval dt3; dt4 to reduce or compensate a difference ΔIDD1, ΔIDD2 between an overall power consumption IDDmax of the packaged electronic device 10 during the first time interval dt2 and an overall power consumption IDDmax of the packaged electronic device 10 during the second time interval dt3; dt4.

According to an example, the method may further include the step of maintaining a constant amount of the overall power consumption IDDmax of the packaged electronic device 10 during the first time interval dt2 and the second time interval dt3; dt4.

Additionally or alternatively, the step of causing the additional power consumption may include causing the additional power consumption such that the overall power consumption IDDmax of the packaged electronic device 10 during the second time interval dt3; dt4 differs by less than ±20% from the overall power consumption IDDmax of the packaged electronic device 10 during the first time interval dt2.

Further additionally or alternatively, the step of causing the additional power consumption may include causing the additional power consumption such that the magnitude of the overall power consumption IDDmax of the packaged electronic device 10 during the second time interval dt3; dt4 is the same as the magnitude of the overall power consumption IDDmax of the packaged electronic device 10 during the first time interval dt2.

Still further additionally or alternatively, the step of causing the additional power consumption may include causing the additional power consumption during the second time interval dt3; dt4 by switching the second circuit 12 into the first mode during the second time interval dt3; dt4.

According to a further example, the method may include the step of communicating with a third circuit being provided on the packaged electronic device 10 and causing the additional power consumption during the second time interval dt3; dt4 by powering the third circuit during the second time interval dt3; dt4.

According to yet a further example, the method may include the step of adjusting the power consumption of the third circuit such that its power consumption during the second time interval dt3; dt4 reduces or compensates the difference between the overall power consumption IDDmax of the packaged electronic device 10 during the first time interval dt2 and the second time interval dt3; dt4.

According to yet a further example, the method may include the step of communicating with a plurality of switchable circuits being provided on the packaged electronic device 10 and estimating, prior to powering one or more of the plurality of circuits during the second time interval dt3; dt4, the resulting overall power consumption IDDmax of the electronic device 10 when these one or more circuits are powered, and selectively powering those one or more circuits during the second time interval dt3; dt4 which circuits cause the additional power consumption in the electronic device 10 during the second time interval dt3; dt4.

A further example that is disclosed in combination with the above discussed examples is:

An apparatus comprising: means for communicating with a first circuit being provided on a packaged electronic device, the first circuit having a temperature sensitive behavior; means for communicating with a second circuit provided on the packaged electronic device, the second circuit being switchable between a first operating mode and at least one second operating mode, wherein a power consumption of the second circuit in the first operating mode is higher than a power consumption of the second circuit in the second operating mode; means for switching the second circuit into the first operating mode during a first time interval and switching the second circuit into the second operating mode during a second time interval; and means for causing an additional power consumption in the packaged electronic device during the second time interval to reduce or compensate a difference between an overall power consumption of the electronic device during the first time interval and the second time interval.

In the following, the concept of the present disclosure shall be briefly discussed in a few other words.

A packaged sensor (e.g. MEMS and ASIC) may dissipate a certain amount of power and may have a respective self-heating. The temperature dependence of the sensor itself (including self-heating) may typically be considered and calibrated away. This calibration relies on measurement of the temperature. Since the temperature measurement may not be able to track fast changes, this approach works well for slow changes of temperature but may not properly work for fast changes of temperature. In a combined system in package, where one sensor 11 is always on, the other sensor(s) 12 are periodically or one time switched on/off, the always on sensor 11 may be affected by current changes or due to current (power) changed temperature.

Typically systems that may be affected by these "thermal xtalk" are combinations of a fast sensor (Microphone) 11 with duty cycled sensors (Humidity, Gas, Pressure, Temperature) 12.

Thus fast changes of current/temperature will show up, when a building block is activated for a measurement task, and after that is shut down again.

In some embodiments, current consumption IDDmax is kept constant. This can be done with the help of a common shunt regulator, however with the disadvantage of additional current consumption by the LDO regulator loop and considerable area overhead. Another solution is to control the current in a way that the change is only slow with low harmonic content. This solution again leads to higher overall consumption and very low possible output data rates.

In some embodiments of the present disclosure, a shunt regulator or any other analog means is not used, but the consumption is controlled based on the operating mode.

This can be done by a state machine 51, which typically controls the measurement sequence. Being aware of this sequence, the state machine 51 can control either blocks 52, 53 to stay active, also if no measurements are conducted, or add current by help of a dummy current DAC 55 so that the current consumption IDDmax stays mostly constant.

Typically for a gas/pressure/humidity sensor 21, both the sensed gas/pressure/humidity information as well as the temperature information is needed in order to determine the correct physical value. For a high precision temperature measurement, blocks with disturbers (SC blocks) need to be isolated from the commonly used ADC or must be switched off. In this case the dummy current sources or dummy current DAC 55 must be switched in to create the same consumption.

Current consumption in duty cycling mode is shown in FIG. 4A.

The desired current consumption is shown in FIG. 4B.

The proposed (simple) solution, e.g., a combination of "always on" blocks 11 and dummy current DAC 55 is shown in FIG. 4C.

A system block diagram may look like shown in FIG. 5. The state machine 51 is aware of the scheduled measurements and simply switches in the desired blocks 52, 53, 54, 55. The current difference needed by the dummy DAC 55 may be trimmed in the frontend test and stored in NVM memory 56.

A system 10 according to the present disclosure, as shown in FIG. 2, may include package 14, microphone 11, 21 and pressure/temperature sensor 12. The microphone 11, 21 is in always on condition (listening to speech commands), and the P/T sensor 12 reacts on command.

As shown in FIG. 3, a measurement without quiet constant energy consumption would lead to momentarily heated up package 14, which causes sound pressure and results in audible disturber at the microphone output signal. This is depicted in FIG. 3, where the solid line shows the situation without constant current and the dashed line 36a shows the situation with the proposed solution.

Summarizing, embodiments of the present disclosure are directed to dynamic changes in supply current (power consumption) that causes changes in chip temperature. Dynamic changes may be caused by switching on/off building blocks in chips, which are used only in pulsed mode for e.g. measurement tasks. Changes in chip temperature may have an effect on other sensors or circuits in same package. Those circuits may be sensitive to changes at certain frequencies in the audio band. Cross talk from disturbers at these frequencies needs to be minimized.

Until now there is no existing solution known. A thermal management of the package may help to reduce the problem. This new disclosure is advantageous in simplicity, silicon size and power consumption.

Accordingly, some embodiments of the present disclosure provide a general method for introducing a digitally controlled current consumption with minimal power overhead. A more constant current consumption will reduce the thermal and electric introduced crosstalk to other sensitive blocks on the same chip or in the same package.

In future combined sensor (T+Mic, P+T+Mic, Gas+T+P+Mic) solutions, unwanted crosstalk between sensor and readout circuits may be minimized. An example application is the combination of microphones and pressure or temperature sensors in the same package.

The disclosed embodiment method has a unique property, namely the supply current may be kept constant. If the sensor has a duty cycled operation, the peak current will not be increased in "always on" mode, but stays constant.

Although some aspects may have been described in the context of an apparatus or device, these aspects may also represent a description of a corresponding method, where a block or device may correspond to a method step or a feature of a method step. Analogously, aspects described in the context of a method step may also represent a description of a corresponding block or item or feature of a corresponding apparatus or device.

Depending on certain implementation requirements, one or more examples of the present disclosure may be implemented in hardware or in software. The implementation may be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

One or more examples of the present disclosure may include a data carrier having electronically readable control signals, which may be capable of cooperating with a programmable computer system, such that one of the methods described herein is performed.

Generally, examples of the present disclosure may be implemented as a computer program product with a program code, the program code being operative for performing one of the methods when the computer program product runs on a computer. The program code may for example be stored on a machine readable carrier.

Other examples may include the computer program for performing one of the methods described herein, stored on a machine readable carrier.

In other words, one or more of the examples of a method according to the present disclosure may therefore be a computer program having a program code for performing one of the methods described herein, when the computer program runs on a computer.

One or more further examples of a method according to the present disclosure may be a data carrier (or a digital storage medium, or a computer-readable medium) comprising, recorded thereon, the computer program for performing one of the methods described herein.

One or more further examples of a method according to the present disclosure may be a data stream or a sequence of signals representing the computer program for performing one of the methods described herein. The data stream or the sequence of signals may for example be configured to be transferred via a data communication connection, for example via the Internet.

One or more further examples may include a processing means, for example a computer, or a programmable logic device, configured to or adapted to perform one of the methods described herein.

One or more further examples may include a computer having installed thereon the computer program for performing one of the methods described herein.

In some examples, a programmable logic device (for example a field programmable gate array) may be used to perform some or all of the functionalities of the methods described herein. In one or more examples, a field programmable gate array may cooperate with a microprocessor in order to perform one of the methods described herein. Generally, the methods may be performed by any hardware apparatus.

The above described examples are merely illustrative for the principles of the present disclosure. It is understood that modifications and variations of the arrangements and the details described herein will be apparent to others skilled in the art. It is the intent, therefore, to be limited only by the scope of the impending patent claims and not by the specific details presented by way of description and explanation of the examples herein.

What is claimed is:

1. An electronic device in a package, the electronic device comprising:
    a first circuit having a temperature sensitive behavior;
    a second circuit being switchable between a first operating mode, a second operating mode, and a third operating mode, wherein the second circuit is configured to be powered-on when performing a first function in the first operating mode, the second circuit is configured to be in a standby mode in the second operating mode, and the second circuit is configured to be powered-on while not performing the first function in the third operating mode, wherein a power consumption of the second circuit in the first operating mode and in the third operating mode is higher than a power consumption of the second circuit in the second operating mode;
    a third circuit configured to consume additional power when activated; and
    a controller configured to
        switch the second circuit into the first operating mode and deactivate the third circuit during a first time interval,
        switch the second circuit into the second operating mode and activate the third circuit a second time interval, and
        switch the second circuit into the third operating mode and deactivate the third circuit during a third time interval, wherein a power consumption of the third circuit during the second time interval and a power consumption of the second circuit during the second time interval reduces or compensates a difference between an overall power consumption of the electronic device during the first time interval and an overall power consumption of the electronic device during the second time interval and during the third time interval.

2. The electronic device of claim 1, wherein the controller is configured to maintain a constant amount of the overall power consumption of the electronic device during the first time interval and the second time interval.

3. The electronic device of claim 1, wherein the controller is configured to cause additional power consumption such that the overall power consumption of the electronic device during the second time interval differs by less than ±20% from the overall power consumption of the electronic device during the first time interval.

4. The electronic device of claim 1, wherein the controller is configured to cause additional power consumption such that a magnitude of the overall power consumption of the electronic device during the second time interval is the same as the magnitude of the overall power consumption of the electronic device during the first time interval.

5. The electronic device of claim 1, wherein the third circuit is a Digital-to-Analog-Converter.

6. The electronic device of claim 1, wherein the controller is configured to adjust the power consumption of the third circuit such that its power consumption during the second time interval reduces or compensates the difference between the overall power consumption of the electronic device during the first time interval and the overall power consumption of the electronic device during the second time interval.

7. The electronic device of claim 1, wherein the electronic device comprises a plurality of switchable circuits, wherein the controller is configured to estimate, prior to powering one or more circuits of the plurality of switchable circuits during the second time interval, a resulting overall power consumption of the electronic device when the one or more circuits of the plurality of switchable circuits are powered, and wherein the controller is further configured to selectively power the one or more circuits of the plurality of switchable circuits during the second time interval which circuits cause additional power consumption in the electronic device during the second time interval.

8. The electronic device of claim 1, wherein the first circuit is a microphone or a microphone control circuit.

9. The electronic device of claim 1, wherein the second circuit is at least one of a pressure sensing circuit, a temperature sensing circuit, a moisture sensing circuit, and a gas sensing circuit.

10. A method comprising:
    communicating with a first circuit being provided on a packaged electronic device, the first circuit having a temperature sensitive behavior;
    communicating with a second circuit provided on the packaged electronic device, the second circuit being switchable between a first operating mode, a second operating mode, and a third operating mode, wherein the second circuit is configured to be powered-on when Performing a first function in the first operating mode, the second circuit is configured to be in a standby mode in the second operating mode, and the second circuit is configured to be powered-on while not performing the first function in the third operating mode, wherein a power consumption of the second circuit in the first operating mode and in the third operating mode is higher than a power consumption of the second circuit in the second operating mode;
    communicating with a third circuit configured to consume additional power when activated;
    switching the second circuit into the first operating mode and deactivating the third circuit during a first time interval;
    switching the second circuit into the second operating mode and activating the third circuit during a second time interval; and
    switching the second circuit into the third operating mode and deactivating the third circuit during a third time interval, wherein a power consumption of the third circuit during the second time interval and a power consumption of the second circuit during the second time interval reduces or compensates a difference between an overall power consumption of the packaged electronic device during the first time interval and an overall power consumption of the packaged electronic device during the second time interval and during the third time interval.

11. The method of claim 10, further comprising the step of keeping a magnitude of the overall power consumption of the packaged electronic device at a constant level during the first time interval and the second time interval.

12. The method of claim 10, wherein the step of switching the second circuit into the second operating mode and activating the third circuit during the second time interval causes additional power consumption such that the overall power consumption of the packaged electronic device during the second time interval differs by less than ±20% from the overall power consumption of the packaged electronic device during the first time interval.

13. The method of claim 10, wherein the step of switching the second circuit into the second operating mode and activating the third circuit during the second time interval causes additional power consumption such a magnitude of the overall power consumption of the packaged electronic device during the second time interval is the same as the magnitude of the overall power consumption of the packaged electronic device during the first time interval.

14. The method of claim 10, further comprising the step of adjusting the power consumption of the third circuit such that its power consumption during the second time interval reduces or compensates the difference between the overall power consumption of the packaged electronic device during the first time interval and the overall power consumption of the packaged electronic device during the second time interval.

15. The method of one of claim 10, further comprising the step of communicating with a plurality of switchable circuits being provided on the packaged electronic device and estimating, prior to powering one or more circuits of the plurality of switchable circuits during the second time interval, a resulting overall power consumption of the electronic device when the one or more circuits of the plurality of switchable circuits are powered, and selectively powering the one or more circuits of the plurality of switchable circuits during the second time interval which circuits cause additional power consumption in the electronic device during the second time interval.

16. A non-transitory computer readable digital storage medium having stored thereon a computer program having a program code for performing, when running on a computer, a method for communicating with a first circuit being provided on a packaged electronic device, the first circuit having a temperature sensitive behavior;
communicating with a second circuit provided on the packaged electronic device, the second circuit being switchable between a first operating mode, a second operating mode, and a third operating mode, wherein the second circuit is configured to be powered-on when performing a first function in the first operating mode, the second circuit is configured to be in a standby mode in the second operating mode, and the second circuit is configured to be powered-on while not performing the first function in the third operating mode, wherein a power consumption of the second circuit in the first operating mode is higher than a power consumption of the second circuit in the second operating mode;
communicating with a third circuit configured to consume additional power when activated;
switching the second circuit into the first operating mode and deactivating the third circuit during a first time interval:
switching the second circuit into the second operating mode and activating the third circuit during a second time interval; and
switching the second circuit into the third operating mode and deactivating the third circuit during a third time interval, wherein a power consumption of the third circuit during the second time interval and a power consumption of the second circuit during the second time interval reduces or a difference between an overall power consumption of the packaged electronic device during the first time interval and an overall power consumption of the packaged electronic device during the second time interval and during the third time interval.

17. An electronic device comprising:
a first circuit having a temperature sensitive behavior;
a second circuit coupled to the first circuit and configured to be powered-on while performing a first function, to be powered-on and not performing the first function, and to be powered down;
a third circuit coupled to the first circuit or to the second circuit and configured to be powered-on while performing a second function, and to be powered-down;
a current compensation circuit configured to draw a compensating current; and
a controller coupled to the second circuit, to the third circuit and to the current compensation circuit, the controller configured to
in a first time period, activate the second circuit, cause the second circuit to perform the first function, deactivate the third circuit, and cause the current compensation circuit to draw a first compensating current;
in a second time period, activate the second circuit, cause the second circuit not to perform the first function, deactivate the third circuit, and cause the current compensation circuit to draw a second compensating current; and
in a third time period, deactivate the second circuit, activate the third circuit, cause the third circuit to perform the second function, and cause the current compensation circuit to draw a third compensating current, wherein the third compensating current is greater than the first compensating current and the second compensating current, wherein an overall current draw of the electronic device is substantially the same during the first time period, the second time period and the third time period.

18. The electronic device of claim 17, wherein:
the first circuit comprises a Micro-Electro-Mechanical-System (MEMS) sensor;
the second circuit comprises an analog front end coupling to an output of the MEMS sensor, and the first function comprises providing data based measurements based on the MEMS sensor; and
the third circuit comprises a temperature measurement circuit.

19. The electronic device of claim 17, wherein the current compensation circuit comprises a current digital to analog converter configured to provide a dummy current.

20. The electronic device of claim 1, further comprising a fourth circuit configured to perform a third function, wherein the controller is further configured to activate the fourth circuit and cause the fourth circuit to perform the third function during the third time interval, and deactivate the fourth circuit during the first and second time intervals, wherein a power consumption of the third circuit and the fourth circuit during the third time interval reduces or compensates the difference between the overall power consumption.

* * * * *